(12) United States Patent
Debrauwer et al.

(10) Patent No.: US 10,662,341 B2
(45) Date of Patent: May 26, 2020

(54) PHOTOCROSSLINKABLE CORRECTION FLUID

(71) Applicant: SOCIETE BIC, Clichy (FR)

(72) Inventors: Christelle Debrauwer, Saint Germain sur Morin (FR); Coralie Fricou, Colmar (FR); Khalid Zahouily, Lutterbach (FR)

(73) Assignee: SOCIETE BIC, Clichy (FR)

( * ) Notice: Subject to any disclaimer, the term of this patent is extended or adjusted under 35 U.S.C. 154(b) by 52 days.

(21) Appl. No.: 15/319,531

(22) PCT Filed: Jun. 12, 2015

(86) PCT No.: PCT/FR2015/051558
§ 371 (c)(1),
(2) Date: Dec. 16, 2016

(87) PCT Pub. No.: WO2015/193589
PCT Pub. Date: Dec. 23, 2015

(65) Prior Publication Data

US 2017/0121541 A1  May 4, 2017

(30) Foreign Application Priority Data

Jun. 16, 2014  (FR) ..................... 14 55493

(51) Int. Cl.
*C09D 10/00* (2006.01)
*B41M 7/00* (2006.01)

(52) U.S. Cl.
CPC .......... *C09D 10/00* (2013.01); *B41M 7/0027* (2013.01)

(58) Field of Classification Search
CPC .............. C09D 10/00; B41M 7/0027
See application file for complete search history.

(56) References Cited

U.S. PATENT DOCUMENTS

| 5,824,716 A | 10/1998 | Coqueret et al. |
| 5,922,400 A | 7/1999 | Yau et al. |
| 2004/0130606 A1 | 7/2004 | Tawaraya et al. |
| 2005/0244652 A1 | 11/2005 | Wagner et al. |
| 2009/0208678 A1 | 8/2009 | van Baak et al. |
| 2015/0041092 A1 | 2/2015 | Hieteniemi et al. |

FOREIGN PATENT DOCUMENTS

| EP | 2 557 094 A1 | 2/2013 |
| EP | 2 703 459 A1 | 3/2014 |
| JP | 50100119 | 8/1975 |
| JP | 6-501728 | 2/1994 |
| JP | 7-118581 | 5/1995 |
| JP | 09508158 | 8/1997 |
| JP | 2001508113 | 6/2001 |
| JP | 2004-67777 | 3/2004 |
| JP | 2005-537373 | 12/2005 |
| JP | 2009-203401 | 9/2009 |
| JP | 2009-545663 | 12/2009 |
| JP | 2010-144090 | 7/2010 |
| JP | 2010-270223 | 12/2010 |
| JP | 2011-46854 | 3/2011 |
| WO | 92/07040 | 4/1992 |
| WO | 1994/011450 A1 | 5/1994 |

OTHER PUBLICATIONS

International Search Report dated Aug. 4, 2015 from corresponding International Application No. PCT/FR2015/051558, 5 pages.
Written Opinion dated Aug. 4, 2015 from corresponding International Application No. PCT/FR2015/051558, 4 pages.
Japanese Office Action dated Dec. 18, 2018 in corresponding Japanese Patent Application 2016-573494, 9 pages.
Chinese Office Action dated Dec. 9, 2019 in corresponding Chinese Patent Application No. 201580031861.9, 17 pages.
He Yong et al., "Waterborne Radiation Curing Material", Coatings Technology & Abstracts, pp. 1-5 and 62, Issue 6, Publication Date: Jun. 30, 2007.

*Primary Examiner* — Robert S Walters, Jr.
(74) *Attorney, Agent, or Firm* — Ohlandt, Greeley, Ruggiero & Perle, L.L.P.

(57) ABSTRACT

The present disclosure relates to a water-based correction fluid comprising a—a photocrosslinkable acrylate and/or methacrylate oligomer, b—a photoinitiator, c—an opacifying agent, and d—water, e—optionally a photocrosslinkable acrylate and/or methacrylate monomer, and f—optionally an additive. The fluid has a dry extract of between 40 and 80% by weight relative to the total weight of the fluid, advantageously between 54 and 66%, and forms a film after drying comprising at least 40% by weight of opacifying agent relative to the total weight of the film, advantageously between 40 and 80% by weight. The present disclosure also relates to a device for applying the correction fluid and a process for covering a mark on a paper support using the correction fluid.

17 Claims, No Drawings

PHOTOCROSSLINKABLE CORRECTION FLUID

BACKGROUND OF THE DISCLOSURE

1. Field of the Disclosure

The present invention relates to water-based photocrosslinkable correction fluids.

Correction fluids, for correcting marks made by a writing implement, in particular a pen, are well known. Such fluids are applied to the mark present on a piece of paper and when they dry they provide a film, generally white in color, which covers the erroneous mark. A correction mark may then be applied to the dry film.

Two types of physically drying fluids (evaporation of solvents) are currently available on the market:
  based on organic solvent: quick-drying but release VOCs.
  water-based: non-toxic but slow-drying, generally with a drying time >120 s.

Another existing corrector system is that of the roller, but in this case the formula is a dry formula, and although drying is very rapid and does not release VOCs, the technology is completely different.

2. Description of the Related Art

Patent application WO94/11450 describes a photocrosslinkable correction fluid having a short drying time of less than or equal to 10 s. However, either this fluid does not contain solvents, or it contains a volatile solvent, that is to say an organic solvent. Now, the use of a volatile solvent poses problems of releasing VOCs. In addition, a correction fluid without solvent poses a problem of migration of the writing ink after deposition (the writing mark reappears through the correction fluid) due to too shallow a crosslinking of the film because of the too high concentration of photocrosslinkable materials in this fluid.

Application US2012/0041092 describes an opaque coating composition comprising a resin which is able to crosslink to form a film under the action of UV radiation. This composition is therefore photocrosslinkable. However, this document does not describe a correction fluid. Indeed, the only usage examples relate to paints. Moreover, the composition described is not intended to be used on paper. It is also not intended to cover marks left by rollerball pen ink or ballpoint pen ink or a gel ink, without this ink reappearing (bleeding), without the composition being absorbed by the paper and while subsequently enabling re-writing on the dry film obtained. Indeed, the pigment content described and exemplified in this document is insufficient to have a good covering power over such marks and in particular for the film obtained after drying to avoid phenomena of gradual reappearance of the ink. In addition, in paragraph [0071], this document describes that the crosslinking energy is 100 $MJ/cm^2$ to 5000 $MJ/cm^2$, which is very high. It appears difficult to propose a writing product requiring such a crosslinking energy, due to the safety risks to the consumer. Moreover, using a lower energy would either be ineffective or would increase the drying and crosslinking time too much (several hours). Moreover, the compositions described in this document are not totally devoid of organic solvents.

Application EP2557094 also describes a water-based coating composition which is crosslinkable by radiation. For the same reasons as above, such a composition could not be used as a correction fluid, since the pigment content described and exemplified in this document is insufficient to have a good covering power over the marks left by the rollerball pen ink or ballpoint pen ink or by a gel ink, and in particular for the film obtained after drying to avoid phenomena of gradual reappearance of the ink.

Application EP 2703459 describes a photocrosslinkable ink. It is therefore not a correction fluid and the pigment content described and exemplified in this document is insufficient to have a good covering power over the marks left by the rollerball pen ink or ballpoint pen ink or by a gel ink, and in particular for the film obtained after drying to avoid phenomena of gradual reappearance of the ink.

In addition, according to this document, it is possible that the compositions proposed may contain organic solvents of glycol, glycol ether and alcohol type. This type of solvent may either modify the appearance of the writing mark to be covered (diffusion of the ink into the paper) or cause the problem of bleeding (migration of the writing mark through the correction fluid film).

Thus, none of the documents of the prior art describes or suggests that it is possible to obtain a water-based correction fluid which dries rapidly, that is to say having a drying time of between 5 and 30 seconds.

SUMMARY OF THE DISCLOSURE

The inventors noticed, surprisingly, that it was possible to formulate water-based correction fluids having a short drying time, as long as photocrosslinkable oligomers were used. Indeed, by virtue of UV or visible irradiation, the oligomers crosslink, which makes it possible to rapidly dry the correction fluid without releasing volatile solvents and hence VOCs. Such correction fluids also do not suffer from bleeding phenomena, that is to say the gradual reappearance of the mark by diffusion of the ink through the dry film of correction fluid, and have good covering power, regardless of the type of ink (rollerball pen ink or ballpoint pen ink or gel ink, for example) or its color (blue or black, for example).

The present invention thus relates to a water-based correction fluid comprising:
  a—a photocrosslinkable acrylate and/or methacrylate oligomer,
  b—a photoinitiator,
  c—an opacifying agent, and
  d—water,
  e—optionally a photocrosslinkable acrylate and/or methacrylate monomer, and
  d—optionally an additive, said fluid having a dry extract of between 40 and 80% by weight relative to the total weight of the fluid, advantageously between 50 and 70%, more advantageously between 54 and 66%, and forming a film after drying comprising at least 40% by weight of opacifying agent relative to the total weight of the film, more advantageously between 40 and 80% by weight, in particular between 45 and 80% by weight.

DETAILED DESCRIPTION OF THE DISCLOSURE

Within the meaning of the present invention, "water-based correction fluid" means any correction fluid, the solvent of which is water. Advantageously, such a correction fluid does not contain organic solvent. In particular, the water content of the correction fluid according to the present invention is between 20 and 60% by weight relative to the total weight of the fluid, advantageously between 30 and 50% by weight relative to the total weight of the fluid, more advantageously between 34 and 46% by weight relative to the total weight of the fluid.

Within the meaning of the present invention, "oligomer" means any polymer chain of small size, advantageously consisting of at least two monomers and more advantageously of at most 20 monomers. In particular, an oligomer has a low molecular weight, in general less than 4000 g/mol.

Within the meaning of the present invention, "photocrosslinkable acrylate and/or methacrylate oligomer" means any oligomer as defined above, having at least one acrylate and/or methacrylate unit and crosslinking by means of a radical reaction under the action of UV or visible light.

Advantageously, the oligomer according to the present invention is chosen from acrylates, methacrylates, aliphatic polyurethane acrylates, aromatic polyurethane acrylates, polyester acrylates, polyether acrylates, aliphatic polyurethane methacrylates, aromatic polyurethane methacrylates, polyester methacrylates, polyether methacrylates and mixtures thereof, advantageously from acrylates, polyester acrylates and aliphatic polyurethane acrylates, even more advantageously from aliphatic polyurethane acrylates. Particularly advantageously, the oligomer according to the present invention is a photocrosslinkable acrylate oligomer.

The oligomers according to the present invention may have chain-end functionalities ranging from 2 to 18, in particular 6, and a viscosity which may range from 70 to 4000 mPa·s measured at 25° C., in particular between 70 and 1000 mPa·s. The oligomer according to the present invention may for example be a diacrylate oligomer, in particular an aliphatic polyurethane diacrylate. These oligomers are commercially available, for example from Kromachem under the trade name Etercure® DR-W401. The oligomer according to the invention may also be an acrylate. These oligomers are commercially available, for example from Alberdingk Boley under the trade name Alberdingk® LUX 515. These oligomers may be in the form of an aqueous dispersion.

The correction fluid according to the invention may contain (by weight relative to the total weight of the correction fluid) between 2 and 25% of the photocrosslinkable acrylate and/or methacrylate oligomer, advantageously between 2.5 and 20%, even more advantageously between 3 and 18%, particularly preferably between 3.5 and 16%.

Within the meaning of the present invention, "photocrosslinkable acrylate and/or methacrylate monomer" means any monomer having at least one acrylate and/or methacrylate unit and crosslinking by means of a radical reaction under the action of UV or visible light.

Advantageously, the monomer according to the present invention is chosen from monofunctionalized or polyfunctionalized acrylates, monofunctionalized or polyfunctionalized methacrylates and mixtures thereof, advantageously from polyfunctionalized acrylates. It may in particular be an aromatic or aliphatic monomer of (hydroxylated, ethoxylated, propoxylated) mono-, di-, tri-, tetra- or penta-acrylates and methacrylates, with or without short polymer chains of polyether, polyurethane, polyester, polyepoxy type, modified or unmodified by amine groups. These monomers may have chain-end functionalities ranging from 2 to 6 and in particular a viscosity which may range from 40 to 1000 mPa·s measured at 25° C., in particular from 100 to 500 mPa·s. The monomer is not necessarily present in the correction fluid according to the present invention. Advantageously, it is not present.

Within the meaning of the present invention, "photoinitiator" means any product which makes it possible to initiate the radical crosslinking reaction of the oligomers and the monomers optionally present in the correction fluid according to the invention during the irradiation thereof by a UV or visible light source. Indeed, the photoinitiator, by absorbing energy from the photons emitted, becomes an excited species (in radical form). Thus, this species reacts with the reactive functions of the oligomers and any monomers of the correction fluid, leading to crosslinking of the material. The photoinitiator is therefore advantageously a photoinitiator absorbing in the UV or visible light spectrum, more advantageously a photoinitiator absorbing in the UV-A spectrum. In particular, the photoinitiator according to the present invention will enable surface and/or depth initiation of the radical polymerization reaction. More particularly, the photoinitiator according to the present invention absorbs the emission wavelengths of lamps/LEDs and/or the wavelengths chosen from the range of between 230 and 410 nm, advantageously between 278 and 410 nm, in particular between 362 and 410 nm, more particularly between 400 and 410 nm, such as, for example, 278, 360-400 nm, 365, 382 and 405 nm. In one particular embodiment, the photoinitiator is of type I; advantageously, it is an acylphosphine oxide type photoinitiator; more particularly, it is ethyl (2,4,6-trimethylbenzoyl)phenylphosphinate. These photoinitiators are commercially available, for example from BASF under the trade name Lucirin TPO-L.

The correction fluid according to the invention may contain (as % by weight relative to the dry extract of the correction fluid) between 3 and 10% of the photoinitiator, advantageously between 5 and 7%, in particular approximately 6%.

Within the meaning of the present invention, "opacifying agent" means any pigment which makes it possible to give the correction fluid its covering power, that is to say its ability to completely cover and hide a writing mark. In particular, the opacifying agent is chosen from kaolin, calcium carbonate and titanium oxide. It is advantageously titanium oxide which has a superior opacifying power to kaolin and to calcium carbonate. The titanium oxide may be chosen from rutile titanium oxide, anatase titanium oxide or mixtures thereof, and may optionally have undergone an organic or mineral surface treatment, for example by means of aluminum oxide or zirconium oxide. It may have a mean particle size of between 0.2 μm and 0.4 μm, advantageously 0.21 μm. It may have a mean oil absorption of 37 (amount of linseed oil absorbed in grams, per 100 grams of titanium oxide). It may be in the form of an aqueous dispersion. The titanium oxide is commercially available from Tronox, under the trade name CR-813.

The correction fluid according to the present invention may comprise an additive f), advantageously chosen from an optical brightener, a tone-modifying pigment, for example carbon black to make the tone gray, a cationic resin, a physically drying resin, a dispersant, a photosensitizer, for example of thiolated additive type, a crosslinking accelerator, a siccative, a wetting agent, a filler, a co-solvent, a biocide, an antifreeze, a coalescing agent, a preservative, polyvinyl alcohol and mixtures thereof.

In particular, the correction fluid according to the present invention may contain, as additive f), a physically-drying resin, that is to say which crosslinks by means of an increase in temperature. Such a resin makes it possible to improve the drying time of the correction fluid. It may for example be an acrylic copolymer, in particular in the form of an aqueous dispersion. Such resins are commercially available from Alberdingk Boley under the trade name Alberdingk® AC2524. The content of physically-drying resin in the correction fluid, according to the present invention may be between 10 and 20% by weight relative to the total weight of the correction fluid, advantageously between 15 and 17%.

The physically-drying resin/photocrosslinkable acrylate and/or methacrylate oligomer weight ratio may be approximately 1/1.

The correction fluid according to the present invention may also contain, as additive f), an optical brightener (such as, for example, 2495T—EZE-PG or LAMP BLACK 8592 from EPS/CCA or TINT AYD WD 2018 from Elementis specialities) which makes it possible to make the film appear more or less white. The optical brightener content in the correction fluid according to the present invention, as percentage by weight relative to the dry extract, is between 3 and 7%, advantageously between 4 and 6%; in particular, it is 5%.

The correction fluid according to the present invention may contain, as additive f), a cationic polymer. The cationic polymer makes it possible to avoid or limit migration of the inks present on the paper, and in particular from the mark which has been covered by the correction fluid, into the film during the application of the fluid or over the course of time. It may for example be a quaternary hydroxy functional copolymer, advantageously in the form of an aqueous dispersion. Such polymers are commercially available from Indulor under the trade name Induquat ECR 466L. The content of cationic polymer in the correction fluid according to the present invention may be between 1 and 10% by weight relative to the total weight of the correction fluid, advantageously between 2 and 4%. The cationic polymer/photocrosslinkable acrylate and/or methacrylate oligomer weight ratio may be approximately 1/1.

The correction fluid according to the present invention may contain, as additive f), polyvinyl alcohol. The polyvinyl alcohol is commercially available from Fluka. The content of polyvinyl alcohol in the correction fluid according to the present invention may be between 1 and 10% by weight relative to the total weight of the correction fluid, advantageously between 2 and 4%. The polyvinyl alcohol/photocrosslinkable acrylate and/or methacrylate oligomer weight ratio may be approximately 1/1.

Advantageously, the correction fluid comprises, as additive f), a mixture of cationic polymer and of polyvinyl alcohol, in particular in a cationic polymer/polyvinyl alcohol weight ratio of approximately 1/1. More advantageously, the cationic polymer/polyvinyl alcohol/photocrosslinkable acrylate and/or methacrylate oligomer weight ratio is approximately 1/1/1. The correction fluid according to the present invention may contain, as additive f), a wetting additive. It may be, for example, a silicone surfactant, such as, in particular, a polyether-modified, acryl functional siloxane. Such additives are commercially available from BYK CHEMIE under the trade name BYK-UV 3530.

The wetting additive content in the correction fluid according to the present invention may be between 0.2 and 2% by weight relative to the dry extract of photocrosslinkable oligomer a), advantageously between 0.5 and 1.5%; more advantageously, it is 1%.

The correction fluid according to the present invention may contain, as additive f), a dispersant. It may be, for example, a solution of ammonium polyacrylate or of a sodium polyphosphate. Such dispersants are commercially available from Indulor under the trade name Indunal A and Indunal NHMP. The dispersant content in the correction fluid according to the present invention, as percentage by weight relative to the dry extract, is between 0.1 and 2%, advantageously between 0.2 and 1.5%.

The present invention also relates to a device for applying a correction fluid enabling the application of the correction fluid according to the present invention. All the devices for applying a liquid correction fluid may be useable for applying the correction fluid according to the present invention. The system for applying the fluid of the application device according to the invention may for example be chosen from a foam or bristled brush, a roller applicator, a ball with wide channels, a needle or a strip. It enables in particular a homogenous application, with a thickness which may vary between 10 and 75 µm, more advantageously between 10 and 50 µm.

The application device according to the invention may be provided with a UV or visible irradiation source. The UV or visible irradiation source which enables the crosslinking of the correction fluid according to the invention may emit a monodisperse or polydisperse, in particular monodisperse, wavelength, advantageously chosen in the range of between 230 and 410 nm, advantageously between 278 and 410 nm, in particular between 362 and 410 nm, more particularly between 400 and 410 nm, such as, for example, 278, 360-400 nm, 365, 382 and 405 nm. The irradiation source may thus be a monodisperse light-emitting diode (LED) or a polydisperse metal-halide lamp, such as, for example, a doped mercury vapor lamp, or both.

The present invention also relates to a process for covering a mark on a paper support, comprising the step of:

A—applying the correction fluid according to the present invention so as to form a film covering the mark on the paper support, advantageously having a thickness of between 10 and 75 µm, in particular between 10 and 50 µm;

B—irradiating the film by means of a UV or visible irradiation source, so as to dry the film and to cause crosslinking of the photocrosslinkable acrylate and/or methacrylate oligomer, advantageously for a time of between 5 and 30 s.

The UV or visible irradiation source which may be used in step B is as defined above.

In one particular embodiment, step B provides a dose of irradiation of at least 20 mJ/cm$^2$, advantageously of between 20 and 40 mJ/cm$^2$, more advantageously at a wavelength of between 230 and 410 nm.

In particular, the mark to be covered by the process according to the present invention is obtained from a rollerball pen ink or ballpoint pen ink or from a gel ink, advantageously from a ballpoint pen ink.

Advantageously, by virtue of the process according to the present invention, the degree of crosslinking of the correction fluid obtained in step B varies between 50 and 70% through the depth of the film and between 70% and 100% at the surface, for thicknesses of 25 µm.

It has been observed that, by virtue of the correction fluid according to the present invention, a film may be deposited which has ideal coverage (the pen mark is entirely covered) and no halo appears over time, that is to say there is no migration of the ink within the film of the correction fluid.

The invention will be better understood on reading the following examples, given by way of nonlimiting indication.

Example 1

A correction fluid having the following formulation was tested:

| | Trade name | %/dry extract (DE) of photo-crosslinkable oligomer a) | % by weight |
|---|---|---|---|
| Photocrosslinkable oligomer | LUX515 | DE = 50% | 31.86 |
| Photoinitiator | Lucirin TPO | 6 | 0.96 |
| Opacifying agent: $TiO_2$ | Tronox CR 813 | 200 | 31.86 |
| Physically-drying resin | AC 2524 (DE = 48%) | 100 | 33.19 |
| Wetting additive | BYK UV 3530 | 1 | 0.16 |
| Optical brightener | Dilution of 2459T-EZE PG 1% in 99% water | 5 | 1.59 |
| Dispersant | Indunal A | 1 | 0.32 |
| Dispersant | Indunal NHMP | 0.2 | 0.06 |
| Formulation | DE (%) | 65.2 | |
| | % $TiO_2$ | 31.9 | |
| Film | % binder | 51.2 | |
| | % $TiO_2$ | 48.8 | |

The correction fluid formulation is applied via a polyester cover 20 μm thick onto a sheet of white paper (Clairefontaine, 80 g) on which text has been written by means of a pen. This pen may be a pen having blue ink or black ink. It may be a ballpoint pen or a gel ink pen. By means of a 25 μm calibrated bar, passes are made over the polyester film to apply the formulation. The film is then dried for 30 seconds maximum at room temperature, then it is irradiated under an LED of 400 nm for 40 seconds (5000 mJ/cm$^2$). This application makes it possible to evaluate the coverage of the film and to observe the appearance of the films applied.

The results obtained are as follows:

The coverage is perfect over the ballpoint pen mark in blue or black ink, or the blue or black gel ink pen mark.

The film has a shiny appearance.

Re-writing is possible very rapidly (30 seconds after application).

There is no change in the mark over time.

No phenomena of migration of the writing through the correction fluid film (bleeding) are observed for more than 50 days after application.

Example 2

A correction fluid having the following formulation was tested:

| | Trade name | %/dry extract (DE) of photo-crosslinkable oligomer a) | % by weight |
|---|---|---|---|
| Photocrosslinkable oligomer | Etercure DR-W401A | DE = 38% | 9.6 |
| Photoinitiator | Lucirin TPO | 6 | 0.22 |
| Opacifying agent: $TiO_2$ | Tronox CR 813 | 1200 | 43.75 |
| Cationic resin | Induquat ECR 766L (DE = 32%) | 100 | 11.39 |
| Wetting additive | BYK UV 3530 | 1 | 0.04 |
| Optical brightener | Dilution of 2459T-EZE PG 1% in 99% water | 5 | 2.19 |
| Polyvinyl alcohol | PVA 12-03 DE = 20%) | 100 | 18.23 |
| Solvent | Water | | 14.58 |
| Formulation | DE (%) | 55 | |
| | % $TiO_2$ | 43.8 | |
| Film | % binder | 20.4 | |
| | % $TiO_2$ | 79.6 | |

The coverage test is the same as that used in example 1. The results obtained are similar.

The invention claimed is:

1. A water-based correction fluid comprising:
   a) a photocrosslinkable acrylate oligomer and/or a photocrosslinkable methacrylate oligomer;
   b) a photoinitiator;
   c) an opacifying agent; and
   d) water, wherein the water is present between 20% and 60% of the total weight of the fluid;
   e) optionally a photocrosslinkable acrylate monomer and/or a photocrosslinkable methacrylate monomer; and
   f) optionally an additive,
   wherein the fluid has a dry extract of between 40 and 80% by weight relative to the total weight of the fluid and forms a film after drying comprising at least 40% by weight of opacifying agent relative to the total weight of the film.

2. The correction fluid as claimed in claim 1, wherein the opacifying agent is $TiO_2$.

3. The correction fluid as claimed in claim 1, wherein the photocrosslinkable acrylate oligomer is selected from the group consisting of aliphatic polyurethane acrylates, aromatic polyurethane acrylates, polyester acrylates, polyether acrylates, and mixtures thereof, and wherein the photocrosslinkable methacrylate oligomer is selected from the group consisting of aliphatic polyurethane methacrylates, aromatic polyurethane methacrylates, polyester methacrylates, polyether methacrylates, and mixtures thereof.

4. The correction fluid as claimed in claim 1, wherein the photocrosslinkable acrylate oligomer and/or photocrosslinkable methacrylate oligomer is in the form of an aqueous dispersion.

5. The correction fluid as claimed in claim 1, wherein the photoinitiator is of type I.

6. The correction fluid as claimed in claim 5, wherein the photoinitiator is present in an amount of between 3 and 10% by weight relative to the dry extract of the correction fluid.

7. The correction fluid as claimed in claim 1, wherein the additive f) is selected from the group consisting of an optical brightener, a tone-modifying pigment, a cationic resin, a physically drying resin, a dispersant, a photosensitizer, a crosslinking accelerator, a siccative, a wetting agent, a filler, a co-solvent, a biocide, an antifreeze, a coalescing agent, a preservative, polyvinyl alcohol, and mixtures thereof.

8. The correction fluid as claimed in claim 1, wherein the correction fluid has a drying time, following application in the form of a film of a thickness of between 10 and 75 μm to a paper support, of between 5 and 30 seconds under UV or visible irradiation.

9. The correction fluid as claimed in claim 1, further comprising a dry extract of between 54 and 66% by weight relative to the total weight of the correction fluid.

10. The correction fluid as claimed in claim 1, further comprising forming a film after drying that comprises between 40 and 80% by weight of opacifying agent relative to the total weight of the film.

11. The correction fluid as claimed in claim 1, wherein the correction fluid is free of organic solvent.

12. A process for covering a mark on a paper support, comprising the steps of:
   A) applying the correction fluid as claimed in claim 1 to form a film covering the mark on the paper support and;
   B) irradiating the film by means of a UV or visible irradiation source, to dry the film and to cause cross-linking of the photocrosslinkable oligomer acrylate and/or photocrosslinkable methacrylate oligomer.

13. The process as claimed in claim 12, wherein step B provides a dose of irradiation of at least 20 mJ/cm$^2$.

14. The process as claimed in claim 13, wherein step B provides a dose of irradiation of between 20 and 40 mJ/cm$^2$.

15. The process as claimed in claim 12, wherein the mark to be covered is obtained from a rollerball pen ink or ballpoint pen ink or from a gel ink.

16. The process as claimed in claim 12, wherein in step A the film has a thickness of between 10 and 75 μm.

17. The process as claimed in claim 12, wherein the correction fluid is free of organic solvent.

* * * * *